United States Patent [19]
Kuroda et al.

[11] Patent Number: 5,289,455
[45] Date of Patent: Feb. 22, 1994

[54] INFORMATION RECORDING AN/OR REPRODUCING APPARATUS

[75] Inventors: Ryo Kuroda, Atsugi; Akihiko Yamano, Yokohama; Hiroyasu Nose, Zama; Toshihiko Miyazaki, Hiratsuka; Takahiro Oguchi, Atsugi, all of Japan

[73] Assignee: Canon Kabushiki Kaisha, Tokyo, Japan

[21] Appl. No.: 734,700

[22] Filed: Jul. 23, 1991

[30] Foreign Application Priority Data

Jul. 25, 1990 [JP] Japan .................................. 2-194825

[51] Int. Cl.⁵ .............................................. G11B 9/00
[52] U.S. Cl. .................................... 369/126; 250/306
[58] Field of Search ................ 250/306, 307; 369/101, 369/126; 365/151, 118

[56] References Cited

U.S. PATENT DOCUMENTS

| | | | |
|---|---|---|---|
| 4,956,817 | 9/1990 | West et al. ........................... | 365/189 |
| 5,038,322 | 8/1991 | Van Loenen ........................ | 369/101 |
| 5,204,851 | 4/1993 | Kawada et al. ..................... | 369/126 |

FOREIGN PATENT DOCUMENTS

| | | |
|---|---|---|
| 0335487 | 10/1989 | European Pat. Off. . |
| 0338083 | 10/1989 | European Pat. Off. . |
| 0408009 | 1/1991 | European Pat. Off. . |
| 57-109149 | 7/1982 | Japan . |
| 59-22251 | 2/1984 | Japan . |
| 61-80536 | 4/1986 | Japan . |
| 63-161552 | 7/1988 | Japan . |
| 63-161553 | 7/1988 | Japan . |
| 1-133239 | 5/1989 | Japan . |

OTHER PUBLICATIONS

Physical Review Letters, "Surface Studies by Scanning Tunneling Microscopy", G. Benning et al., vol. 49, No. 1, Jul. 5, 1982, pp. 57–60.

Primary Examiner—Paul M. Dzierzynski
Assistant Examiner—Don Wong
Attorney, Agent, or Firm—Fitzpatrick, Cella, Harper & Scinto

[57] ABSTRACT

An apparatus and method for recording and/or reproducing information onto/from a medium through a probe electrode. A voltage is applied between the medium and the probe electrode and a distance between the medium and the probe electrode is adjusted in such a manner that current becomes a predetermined current value, the current flowing to the probe when the voltage is applied between the medium and the probe electrode. The predetermined current value is changed in accordance with the voltage being applied.

19 Claims, 6 Drawing Sheets

INFORMATION RECORDING AN/OR REPRODUCING APPARATUS

BACKGROUND OF THE INVENTION

1. Field of the Invention

The present invention relates to an apparatus for recording and/or reproducing information.

Particularly, the invention can be suitably used in an apparatus and method for recording and/or reproducing information to which a technique such as a scanning tunnel microscope or the like has been applied.

2. Description of the Related Background Art

In recent years, application of memory materials is a main stream in electronics industries such as computer and its related apparatus, video disc, digital audio disc, and the like. Development of the memory materials is also extremely actively being performed. Although the performances which are required for the memory materials differ depending on the applications, in general, the following points can be mentioned: (1) a density is high and a recording capacity is large; (2) response speeds for recording and reproducing are high; (3) an electric power consumption is small; (4) a productivity is high and a price is low; and the like.

Hitherto, a semiconductor memory using a semiconductor as a raw material and a magnetic memory using a magnetic material as a raw material are main memories. In recent years, however, in association with the advancement of the laser technique, a cheap recording medium of a high density by an optical memory using a thin organic film such as organic coloring matter, photo polymer, or the like has been proposed.

On the other hand, recently, a scanning tunnel microscope (hereinafter, abbreviated to an "STM") which can directly observe an electron structure of a surface plane atom of a conductor has been developed [G. Binnig et al., "Phys. Rev. Lett.," 49,57 (1982)], so that a real space image can be measured at a high resolution irrespective of a monocrystal and an amorphous. Moreover, the STM also has an advantage such that a sample can be observed with a low electric power without causing damage to the sample by a current. Further, the STM can also operate in the atmosphere and can be used for various kinds of materials. Therefore, applications of a wide range of the STM are expected.

The STM uses a principle such that when a bias voltage is applied between a probe (probe electrode) of a metal and a conductive substance and the probe is allowed to approach to a distance of about 1 nm, a tunnel current flows. The tunnel current is very sensitive to a change in distance between them. By scanning the probe so as to keep the tunnel current constant, various information regarding a whole electron cloud of a real space can be also read. At this time, a resolution in the in-plane direction is equal to about 0.1 nm.

Therefore, by applying the principle of the STM, the recording and reproduction at a high density can be sufficiently performed on the atom order (subnanometer). For instance, in the recording/reproducing apparatus disclosed in JP-A-61-80536, atomic particles adsorbed onto the medium surface are eliminated by an electron beam or the like and the writing operation is executed and the data is reproduced by the STM. Further, there have been proposed methods whereby the recording and reproduction are executed by the STM by using a thin film layer as a recording layer made of a material such as $\pi$ electron system organic compound or chalcogen compound class having a memory effect for a switching characteristic of a voltage current (JP-A-63-161552, JP-A-63-161553). According to the above methods, assuming that a recording bit size is equal to 10 nm, the recording and reproduction of a large capacity of $10^{12}$ bits/cm$^2$ can be performed.

SUMMARY OF THE INVENTION

The invention is an applied invention of the foregoing conventional example. It is the first object of the invention to provide a recording and/or reproducing apparatus and method in which the recording and/or reproduction of information can be efficiently performed without a fear of damage of a probe tip and a recording medium.

The above and other objects and features of the present invention will become apparent from the following detailed description and the appended claims with reference to the accompanying drawings.

DETAILED DESCRIPTION OF THE PREFERRED EMBODIMENTS

Figure 1:
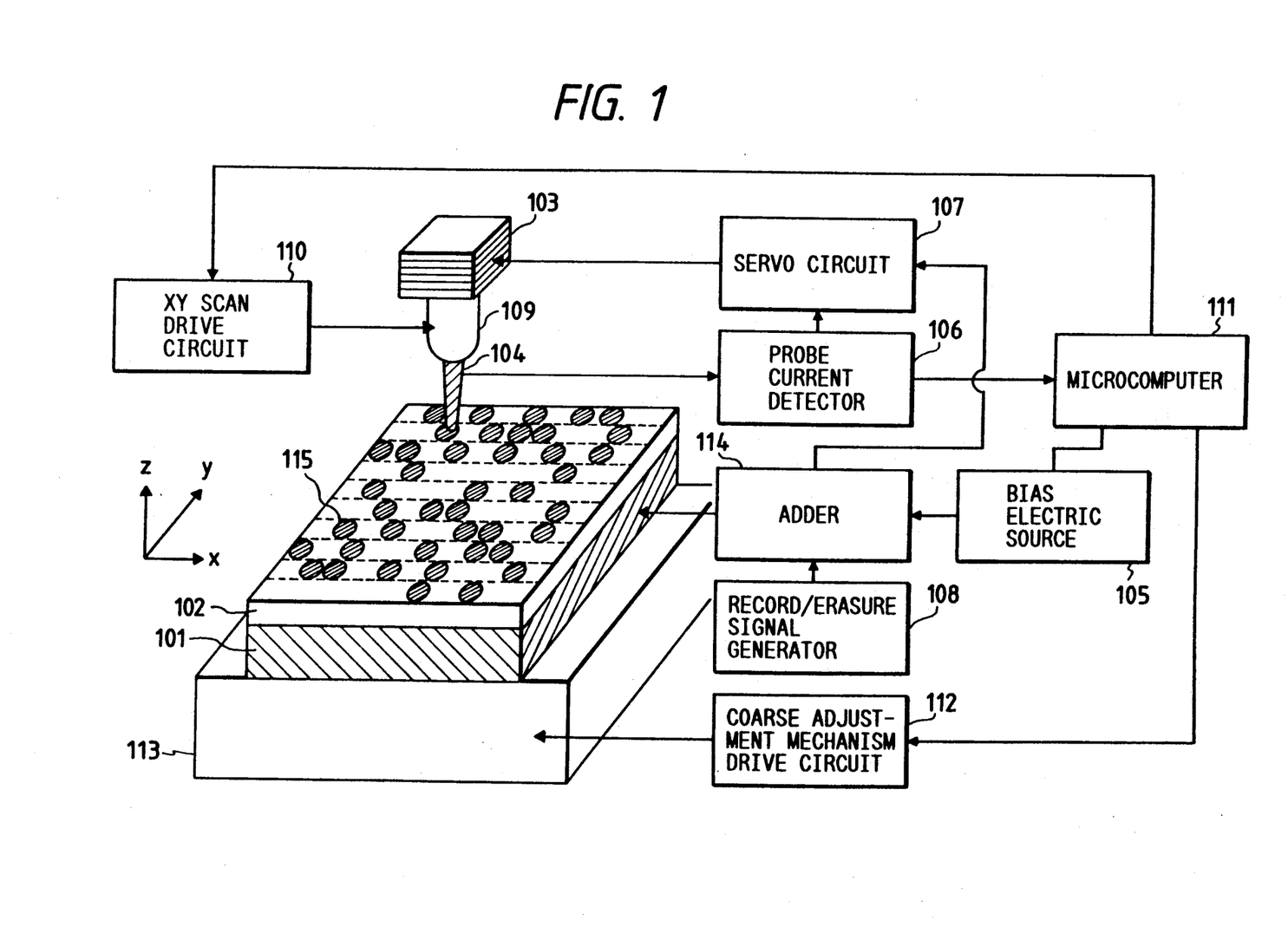
FIG. 1 is a block diagram showing a construction of a recording and/or reproducing apparatus according to an embodiment of the invention.

FIG. 1 is a diagram showing a recording and/or reproducing apparatus according to a preferred embodiment of the invention.

As shown in the diagram, the recording/reproducing apparatus comprises: a probe electrode 104 which is arranged such that a tip of the probe electrode is close to the surface of a recording medium 102; a bias electric source 105 as means for applying a voltage between a substrate electrode 101 arranged on the back surface of the recording medium 102 and the probe electrode 104; a record/erasure signal generator 108; an adder 114 for adding outputs of the bias electric source 105 and the generator 108 and for applying between the electrode 104 and the medium 105; a probe current detector 106 to detect a current flowing between the recording medium 102 and the probe electrode 104; a longitudinal direction driving mechanism 103 for driving the probe electrode in the longitudinal direction (Z direction) to fluctuate a distance between the probe electrode 104 and the recording medium 102; and a servo circuit 107 to output a control signal to drive the longitudinal direction driving mechanism 103 on the basis of the voltage applied by the voltage applying means and the current detected by the probe current detector 106 in a manner such that a current which is equal to a value of the current flowing for the applied voltage flows between the probe electrode 104 and the recording medium 102 in the case where the distance between the probe electrode 104 and the recording medium 102 is set to be constant. The recording medium 102 and the substrate electrode 101 are held on a coarse adjustment mechanism 113. By driving the coarse adjustment mechanism 113 through a coarse adjustment mechanism drive circuit 112 by a microcomputer 111, the recording medium 102 is relatively moved for the probe electrode 104.

An epitaxial growth plane of gold or a graphite cleavage plane on a flat substrate made of a glass or mica or the like can be used as a substrate electrode 101. Squarilium-bis-6-octyl azulene (hereinafter, abbreviated to "SOAZ") is used as a recording medium 102. A built-up film of two layers of monomolecular films is formed on the surface of the substrate electrode 101 by a Langmuir-Blodgett's technique.

As a probe electrode 104, it is possible to use an electrode which is obtained by electrolyte polishing a tungsten line or the like or by mechanically cutting a platinum line or the like and whose tip is sharp (radius of curvature is less than 1 $\mu$m) and which is conductive.

A PZT device or the like is used as a longitudinal direction driving mechanism 103, a bias voltage of about 1 V is applied between the substrate electrode 101 and the probe electrode 104 by the bias electric source 105, and a probe current flowing between them is detected by the probe current detector 106.

Figure 2:
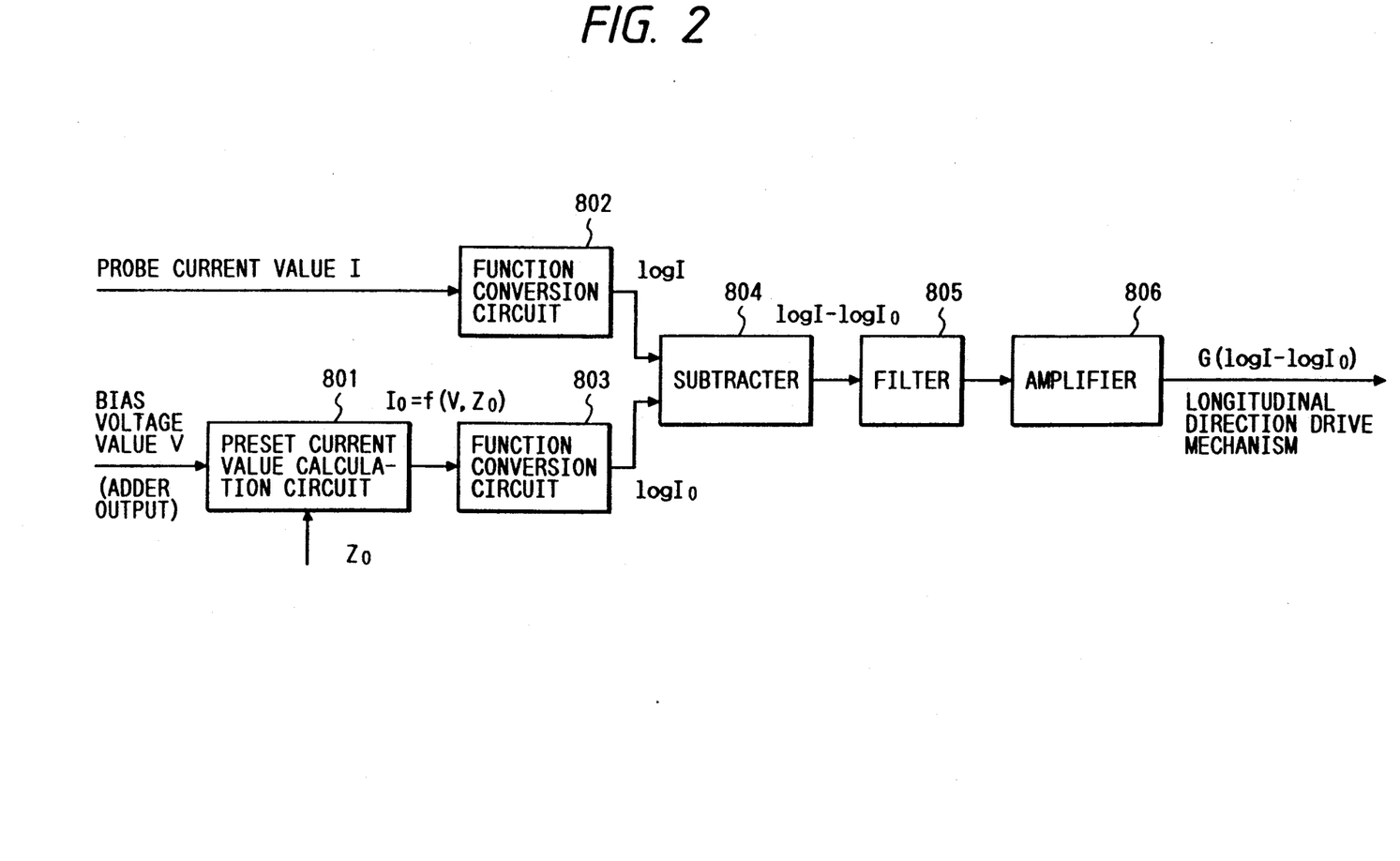
FIG. 2 is a block diagram showing the details of a servo circuit in FIG. 1.

FIG. 2 is a block diagram of the servo circuit 107.

In the diagram, reference numeral 801 denotes a preset current value calculation circuit to calculate a set current value $I_0$ for an applied bias voltage value V and a distance set value $Z_0$. A calculating method in the above case differs depending on current-voltage characteristics between the probe electrode 104 and the substrate electrode 101. For instance, when a tunnel current characteristic or a field emission current characteristic is exhibited, the set current value $I_0$ is calculated by the following equations.

$$I_0 = \frac{A \exp(-BZ_0)}{Z_0} V \qquad (1)$$

(tunnel current characteristic)

$$I_0 = C\left(\frac{V}{Z_0}\right)^2 \exp\left(\frac{-DZ_0}{V}\right) \qquad (2)$$

(field emission current characteristic)

Where, A, B, C, D denote constants which are predetermined by substances constructing the electrode and the recording medium.

In more general, assuming that an interval between the probe electrode and the substrate electrode is set to Z, the set current value $I_0$ is calculated in accordance with the following equation $$I_0 = f(V, Z_0)$$

so long as the current (I) — voltage (V) characteristics are expressed by I=f(V, Z).

Reference numerals 802 and 803 denote function conversion circuits for obtaining signals logI and log$I_0$ by, for instance, logarithm converting a detection probe current value I and the set current value $I_0$, respectively; 804 a subtracter for calculating a difference (logI—log$I_0$) between those signals and for outputting; 805 and 806 denote a filter and an amplifier (gain G) for an output of the subtracter 804. A signal G(logI—log$I_0$) which is generated from the amplifier 806 is supplied to the longitudinal direction driving mechanism control means 103. The sign of the gain G by the amplifier 806 is selected so as to drive in such a direction that the probe electrode 104 is away from the substrate electrode 101 when I>$I_0$ and that the probe electrode 104 contrarily approaches the substrate electrode 101 when I<$I_0$. Due to this, the probe current value I is controlled so as to be always equal to the set current value for the applied bias voltage V. By controlling as mentioned above, even if the applied bias voltage V is changed as will be explained hereinlater, a resistance characteristic between the electrodes 101 and 104 is not changed, so that the distance between the probe electrode 104 and the substrate electrode 101 can be held constant.

Since $I_0/V$ is a constant in the case of the equation (1), the execution of the above control according to the equation (1) is equivalent to that a control to make $I_0/V$ constant is executed.

The tracking control by the probe electrode 104 is performed by driving the probe electrode 104 by the microcomputer 111 through an XY scan drive circuit 110 on the basis of the output of the probe current detector 106. The bias electric source 105 is also controlled by the microcomputer 111.

The recording/erasing operations will now be described.

First, the probe electrode 104 is driven by the longitudinal direction driving mechanism 103 so as to approach a desired position of the recording medium 102 until a distance of about sub-nanometer. Subsequently, a signal from the record/erasure signal generator 108 is applied between the substrate electrode 101 and the probe electrode 104 through the adder 114. The recording/erasing operations are executed at a desired position of the recording medium 102 which is close to the tip of the probe electrode 104. In a manner similar to the above, upon reproduction, a bias voltage for reading is applied between the substrate electrode 101 and the probe electrode 104 by the bias electric source 105 and the reproducing operation is executed at a desired position of the recording medium 102 which is close to the tip of the probe electrode 104.

Practically speaking, a reading voltage of 1 V as a voltage which doesn't exceed a threshold voltage which causes an electrical memory effect was applied between the probe electrode 104 and the substrate electrode 101 and the current value was measured. Thus, the off state was exhibited at a current value of $10^{-11}$ A or less. Subsequently, a triangular wave pulse voltage which is equal to or higher than a threshold voltage $V_{th}$ which causes an on state was applied and, thereafter, a voltage of 1 V was again applied for reproduction and the current value was measured. Thus, a current of about $10^{-7}$ A flowed and the on state was observed. That is, the on state was recorded. Subsequently, an inverse triangular wave pulse voltage which is equal to or higher than the threshold value which causes a transition from the on state to the off state was applied and, thereafter, a voltage of 1 V was again applied for reproduction. Thus, the current value at this time was equal to or less than $10^{-11}$ A and it has been confirmed that the state is returned to the off state.

The control of the position in the longitudinal direction of the probe electrode upon recording/reproduction will now be described with reference to FIGS. 3A and 3B to 8.

A comparison example for the embodiment will now be explained.

With respect to a method of controlling the distance between the probe electrode and the recording medium in the recording/reproducing method, there are the following methods: a method whereby the recording-/reproducing operations are executed while controlling the distance so as to make the probe current constant; a method whereby a current mean value which is obtained by averaging the current values which change due to the presence or absence of the recording is used as a reference and the distance is controlled so as to obtain such a reference value; and a method whereby upon recording, a mean value of the current at a time point before the current is enhanced for recording is held as a reference value and the distance is controlled so as to obtain such a reference value.

Figure 3A:
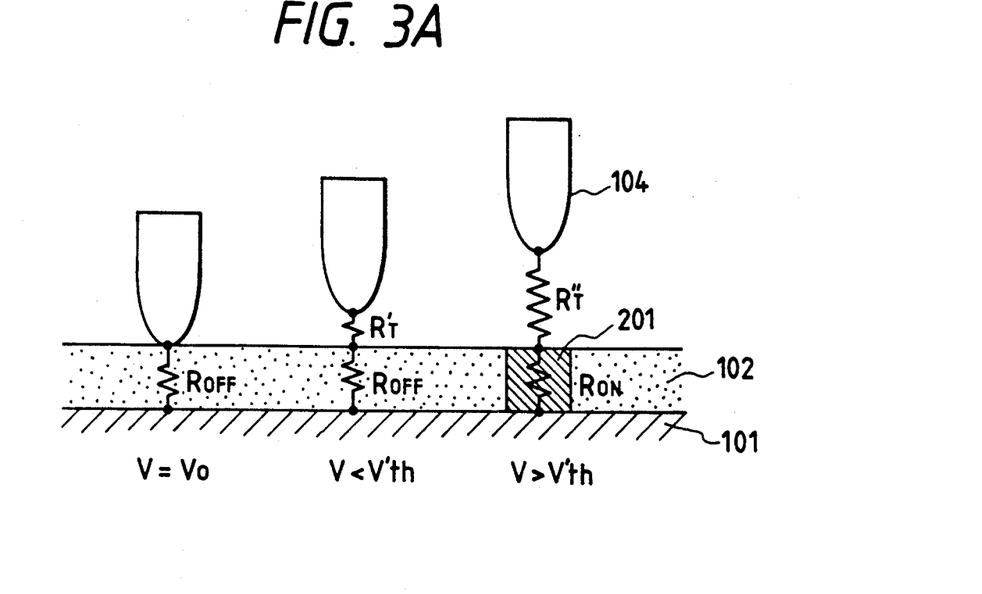
FIGS. 3A, 3B, 4A, and 4B are explanatory diagrams showing a control method of a probe electrode upon recording in the conventional example.
Figure 3B:
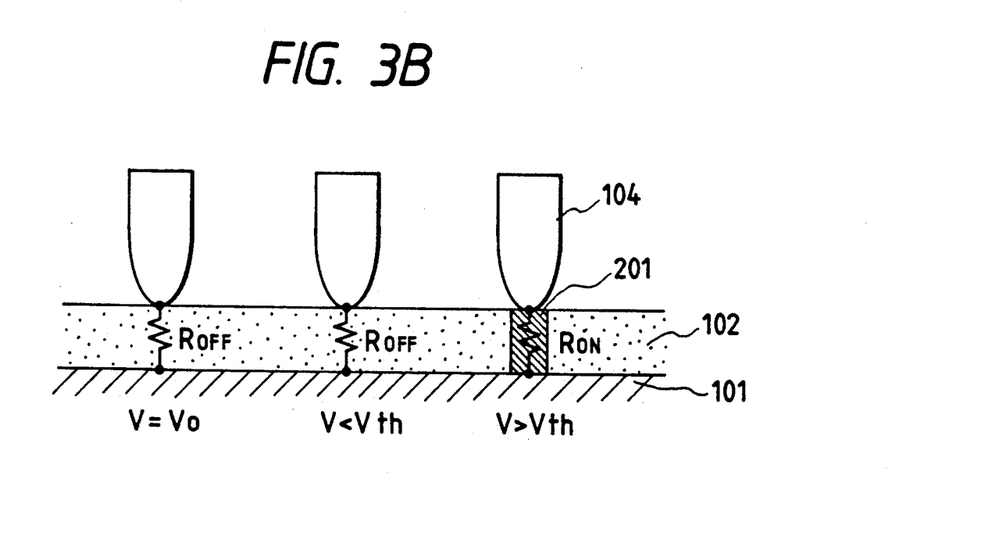
Figure 4A:
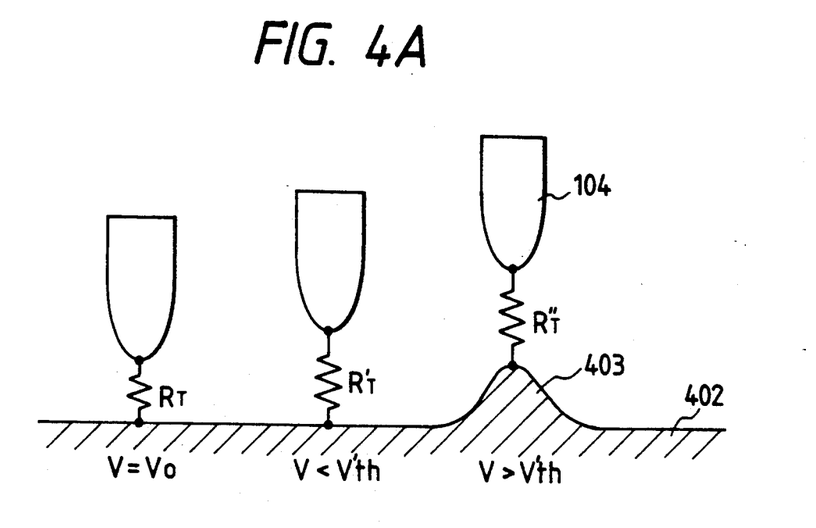
Figure 4B:
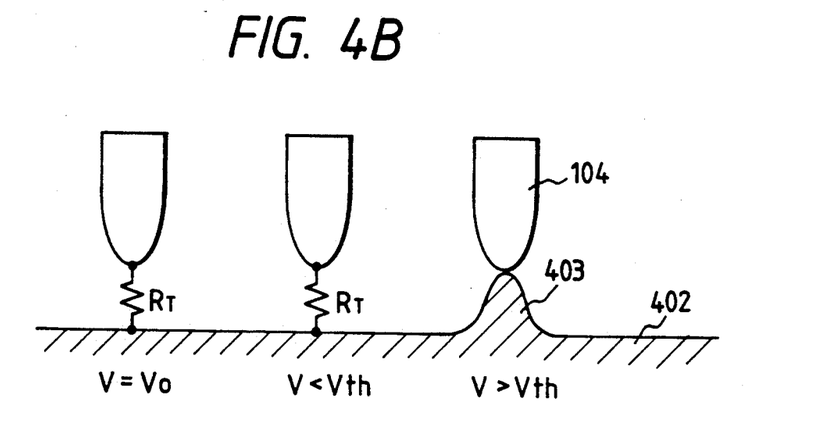

FIGS. 3A and 4A relate to the former case. FIGS. 3B and 4B relate to the latter case. FIGS. 3A and 3B show the case of the medium in which the recording is performed by a change in resistance value. FIGS. 4A and 4B show the case of the medium in which the recording is executed by a change in shape. Each diagram shows a state when the applied voltage between the electrodes 101 and 104 has sequentially been increased from the left.

In the above methods, however, according to the method whereby the distance is controlled so as to make the probe current constant upon recording, as shown in FIGS. 3A and 4A, the distance between the probe electrode 104 and the recording medium 102 or a conductive recording medium 402 increases in a process to increase the applied voltage V in order to perform the recording operation to the recording medium 102 or 402 and the electric field and potential decrease by an amount corresponding to the increase in distance. Therefore, there are problems such that the voltage is not efficiently applied and that a recording bit diameter increases because the voltage is applied in a wide range in correspondence to the increase in the distance.

On the other hand, according to the method whereby the distance is controlled so as to keep the same position before the recording as upon recording, as shown in FIGS. 3B and 4B, there is a problem such that when the resistance value or surface shape of the recording portion has changed, a large current flows, so that the tip of the probe and the medium in the recording portion are damaged.

Figure 5:
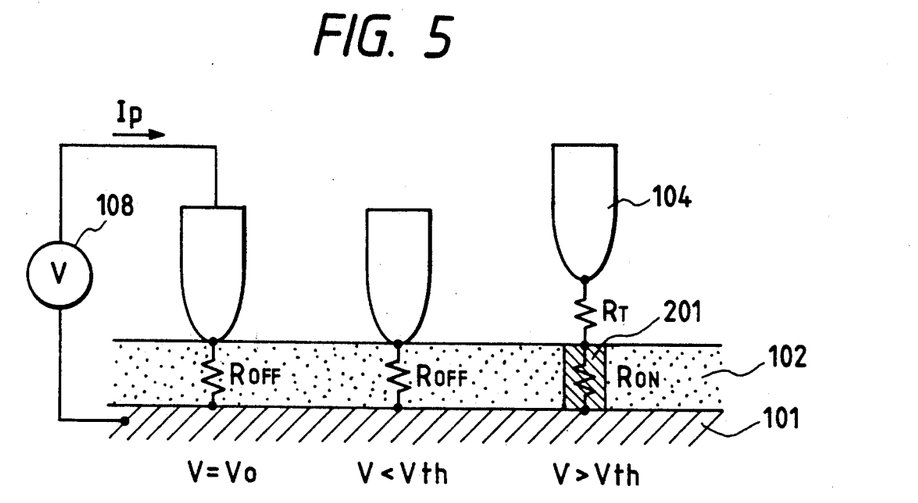
FIG. 5 is an explanatory diagram showing a control method of a probe electrode upon recording in the apparatus of FIG. 1.

FIG. 5 is an explanatory diagram of a method of controlling the position in the longitudinal direction of the probe electrode 104 upon recording. FIG. 5 shows the control method in a manner similar to FIGS. 3A and 3B. In the process to increase the applied voltage V from $V_0$ ($V<V_{th}$) in order to record, the distance between the probe electrode 104 and the substrate electrode 101 is held constant by the control of the longitudinal direction driving mechanism 103 by the servo circuit 107. Thus, since the electric field and the potential are effectively applied to the recording medium 102, the electrical memory effect can be caused by a lower applied voltage (for instance, the threshold voltage $V_{th}$) without losses of the electric field and potential due to an increase in distance between the probe electrode 104 and the substrate electrode 101 in association with an increase in applied voltage V, such losses cannot be avoided by the control to make the probe current I constant as mentioned above. The recording bit diameter also decreases because the distance between the probe electrode 104 and the substrate electrode 101 doesn't increase.

The recording is executed by the applied voltage ($V>V_{th}$) exceeding the threshold voltage $V_{th}$. When a resistance value $R_{OFF}$ in the off state of a recording portion 115 changes (decreases) to a resistance value $R_{ON}$ in the on state, the distance between the probe electrode 104 and the substrate electrode 101 increases until a distance at which a resistance value R of the gap between the probe electrode 104 and the substrate electrode 101 is equal to $R_{ON}+R_T$ ($=R_{OFF}$). Due to this, the recording is executed without causing a large current to flow between the probe electrode 104 and the substrate electrode 101. Damages of the tip of the probe electrode 104 and the medium of a recording portion 201 can be prevented.

Figure 7:
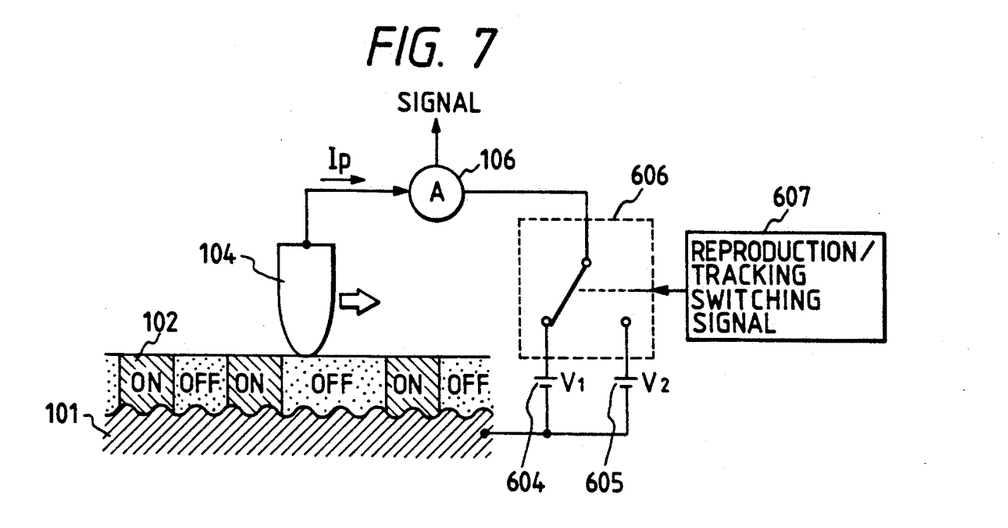
FIG. 7 is an explanatory diagram showing a control method of a probe electrode upon reproduction in the apparatus of FIG. 1.

FIG. 7 is an explanatory diagram of a method of controlling the position in the longitudinal direction of the probe electrode upon reproduction. The substrate electrode 101 is constructed by an atom array of a conductive crystal cleavage plane or the like and has a periodic structure on the surface. The bias electric source 105 is constructed in a manner such that when the recording state of the recording medium 102 on the substrate electrode 101 is reproduced by scanning the probe electrode 104, a bias electric source 604 for reproducing and a bias electric source 605 for tracking are alternately switched by a bias voltage switching circuit 606 in accordance with a switching signal from a reproduction/tracking switching signal generator 607 and the switched source is used. That is, the recording state is reproduced by the bias for reproducing and the periodic structure of the surface of the substrate electrode 101 is detected by the bias for tracking, thereby executing the tracking control. At this time, by controlling the position in the longitudinal direction of the probe electrode 104 in a manner such that the probe current value is always equal to the set current value for the applied bias voltage, a change in distance between the probe electrode 104 and the substrate electrode 101 due to the switching of the bias voltage is eliminated. The longitudinal direction position control amount of the probe electrode 104 directly reflects the recording state and the periodic structure for tracking.

The operation of the embodiment will now be summarized below. In the construction of the embodiment, when a voltage signal which is equal to or higher than a predetermined threshold level which causes the memory effect in the recording medium is applied, a change in electrical characteristic and physical and chemical changes occur in the recording medium portion, so that information is recorded in this portion. Before the memory effect is caused, the distance between the probe electrode and the recording medium is controlled in a manner such that a current which is equal to the value of current flowing for the applied voltage in the case where the distance between the probe electrode and the recording medium is made constant flows between the probe electrode and the recording medium. Therefore, the distance between the probe electrode and the recording medium is held constant even if a voltage fluctuation of the threshold level or less occurs. When the memory effect is caused, the resistance value between the probe electrode and the recording medium decreases due to the change in electrical characteristics and the physical and chemical changes by such a memory effect. Therefore, under the control as mentioned above, the distance between the probe electrode and the recording medium increases by only a supplementary amount of such a decreased amount.

On the other hand, even under the constant applied voltage which is equal to or lower than the threshold level, the distance between the probe electrode and the recording medium is held constant under the foregoing control. When the information recording portion on the recording medium arrives to a position under the probe electrode, in a manner similar to the above, the resistance value between the probe electrode and the recording medium decreases and the distance between the probe electrode and the recording medium is controlled so as to increase by only a supplementary amount of such a decrease amount. That is, a control amount in the above case indicates the recorded information, thereby executing the reproduction.

In any of the recording and reproducing operations, the distance between the probe electrode and the recording medium is set to small enough value and is held constant excluding the recording information portion by the foregoing control and the electric field between the probe electrode and the recording medium is stably held. Therefore, the recording and reproducing operations are efficiently executed at a high S/N ratio and a low error ratio by the stable electric field and by a small recording bit diameter. In the recording information portion, since the distance between the probe electrode and the recording medium is controlled so as to increase, the recording and reproducing operations are executed without causing damage of the probe electrode and the recording medium due to an excessive current flowing between them.

Figure 8:
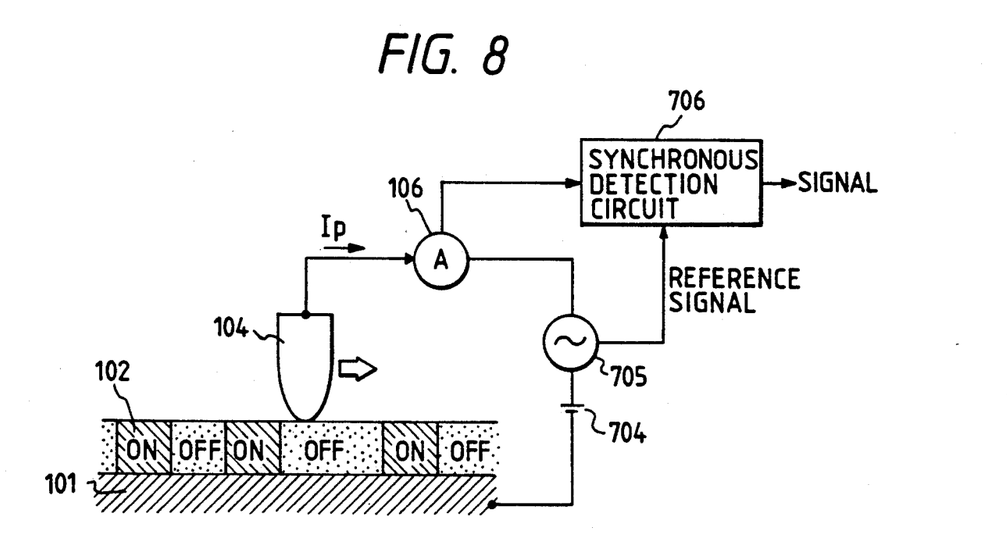
FIG. 8 is an explanatory diagram showing another example of a control method of a probe electrode upon reproduction in the invention.

FIG. 8 is an explanatory diagram of another embodiment of a method of controlling the position in the longitudinal direction of the probe electrode upon reproduction. A DC bias by a DC bias electric source 704 is modulated by a bias modulating circuit 705 and a resultant modulated bias is used as a bias for reproduction. Only the modulation component in a reproduction probe current signal $I_p$ derived is extracted by a synchronous detection circuit 706. By such a method, the noise in the reproduction signal is reduced and the detection of the recording state by a spectroscopic method (information regarding an electron state is obtained from a $dI_p/dV$ signal) is executed.

In the above case as well, as mentioned above, the position control in the longitudinal direction of the probe electrode 104 is executed in a manner such that the probe electrode current value $I_p$ is always equal to the set current value for the applied bias voltage V. Thus, a fluctuation of the distance between the probe electrode 104 and the substrate electrode 101 due to the modulation of the bias voltage doesn't occur. The control amount of the position in the longitudinal direction of the probe electrode 101 directly reflects the recording state.

As a practical example of the position control in the longitudinal direction of the probe electrode 104 according to the invention, explanation has been made above with respect to the examples of the bias change for tracking, noise reduction, and detection of the recording state by the spectroscopic method. However, the concept of the invention is not limited to the above examples but widely intends to keep the distance between the probe electrode and the substrate electrode constant for a bias change.

Figure 6:
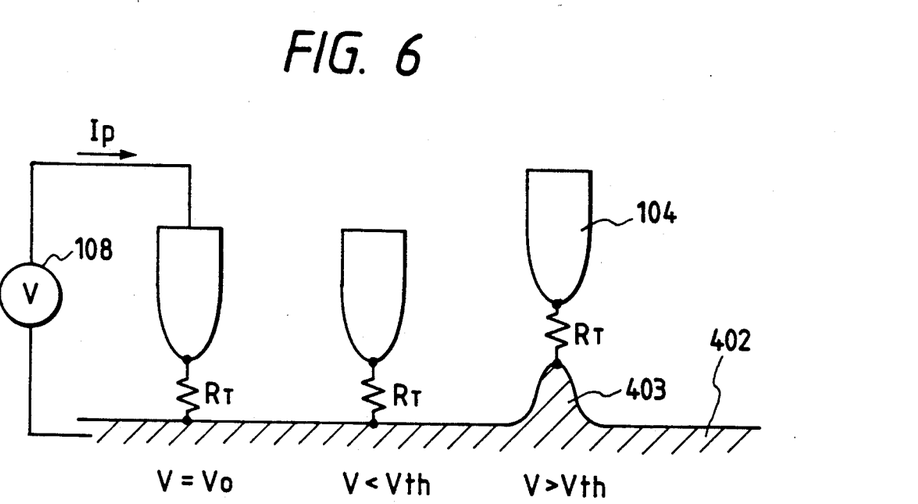
FIG. 6 is an explanatory diagram showing an example in another medium of a control method of a probe electrode upon recording in the invention.

Although the example of the electrical memory effect of the thin organic film has been mentioned above as a recording medium and a recording method, the concept of the invention is not limited to such an example. It is also possible to construct a device in a manner such that a voltage which is equal to or higher than a certain threshold value is applied to the conductive recording medium 402 having a flat surface as shown in FIG. 6, thereby locally changing the surface shape of the recording medium 402 into a concave/convex shape by fusion, evaporation, decomposition, compound, or change in orienting direction. FIG. 6 shows in a manner similar to FIGS. 4A and 4B. The effect of the invention will be obviously understood from FIG. 6. For instance, in the case of the method whereby the recording is executed by forming a concave/convex shape onto the surface, the following materials can be mentioned: an HOPG (Highly-Oriented-Pyrolytic-Graphite) cleavage substrate; an Si wafer; a thin metal film of Au, Ag, Pt, Mo, Cu, etc. which has been evaporation deposited in a vacuum state or which has been epitaxially grown; and glass metal of $Rh_{25}Zr_{75}$, $Co_{35}Tb_{65}$, or the like. In the case of the method whereby the recording is executed by the electron state of the surface, a thin film layer of amorphous Si, organic compound of the $\pi$ electron system, or chalcogen compound class and the like can be mentioned.

It will be obviously understood that the above embodiment is also applied to an apparatus which executes only either one of the recording and reproducing operations.

As described above, according to each of the above embodiments, even if the applied voltage is changed, the distance between the probe electrode and the recording medium can be adjusted. Therefore, there are the following effects: (1) the recording signal can be efficiently applied; (2) the recording bit diameter can be reduced; (3) damage to the tip of the probe and the medium of the recording portion upon recording can be prevented; and (4) various reproducing methods of applying the modulation to the bias such as tracking, improvement of a S/N ratio, spectroscopic method, etc. can be stably realized.

We claim:

1. An apparatus for recording and/or reproducing information onto/from a medium through a probe electrode, said apparatus comprising:
    voltage applying means for applying a voltage between the medium and the probe electrode;
    distance adjusting means for adjusting a distance between the medium and the probe electrode in such a manner that current becomes a predetermined current value, the current flowing between the medium and the probe electrode when the voltage is applied between the medium and the probe electrode; and
    current value changing means for changing the predetermined current value in accordance with the voltage applied by the voltage applying means.

2. An apparatus according to claim 1, wherein the voltage applying means applies between the medium and the probe electrode a constant voltage causing characteristics of the medium not to change, when information is reproduced.

3. An apparatus according to claim 1, wherein the voltage applying means applies between the medium and the probe electrode a voltage causing characteristics of the medium to change, when information is recorded.

4. An apparatus according to claim 1, wherein said distance adjusting means comprises:
probe current detecting means for detecting current value flowing between the medium and the probe electrode;
first function conversion means for logarithmically converting the current value detected by said probe current detecting means to output a first logarithmic conversion signal;
second function conversion means for logarithmically converting the predetermined current value to output a second logarithm conversion signal;
subtraction means for taking a difference between the first and second logarithm conversion signal to output a difference signal;
amplifying means for amplifying the difference signal at a predetermined amplification factor; and
changing means for changing the distance between the medium and the probe electrode on the basis of the difference signal amplified by said amplifying means.

5. An apparatus according to claim 1, wherein the current value changing means changes the predetermined current value, by taking into consideration a desired distance between the medium and a tip of the probe electrode and the voltage value applied between the medium and the probe electrode by the voltage applying means.

6. An apparatus according to claim 1, wherein the current value changing means changes the predetermined current value in such manner that a ratio of the voltage applied between the probe electrode and the medium and the predetermined current value becomes always constant.

7. An apparatus according to claim 1, wherein the current flowing between the medium and the probe electrode is a tunnel current.

8. An apparatus according to claim 1, wherein the current flowing to the probe electrode is a field emission current.

9. An apparatus according to claim 1, wherein said voltage applying means comprises:
a bias electric source to generate a bias voltage to detect the information from the medium;
signal generating means for generating a signal to record or erase the information onto/from the medium through the probe electrode; and
adding means for adding an output of the bias electric source and an output of the signal generating means and for applying between the medium and the probe electrode.

10. An apparatus according to claim 1, wherein said voltage applying means comprises:
a reproducing bias electric source to generate a bias voltage to reproduce the information;
a tracking bias electric source to generate a bias voltage for tracking; and
switching means for switching the bias voltage for reproducing and the bias voltage for tracking and for applying between the medium and the probe electrode.

11. An apparatus according to claim 1, wherein said voltage applying means comprises:
a DC bias electric source; and
bias modulating means for modulating a DC bias voltage generated from the DC bias electric source and for applying between the medium and the probe electrode.

12. A method of recording and/or reproducing information onto/from a medium through a probe electrode, comprising the steps of:
applying a voltage between the medium and the probe electrode;
adjusting a distance between the medium and the probe electrode in such a manner that current becomes a predetermined current value, the current flowing to the probe electrode when the voltage is applied between the medium and the probe electrode; and
changing the predetermined current value in accordance with the voltage applied in the voltage applying step.

13. A method according to claim 12, wherein a constant voltage causing characteristics of the medium not to change is applied between the medium and the probe electrode in the voltage applying step, when information is reproduced.

14. A method according to claim 12, wherein a voltage causing characteristics of the medium to change is applied between the medium and the probe electrode in the voltage applying step, when information is recorded.

15. A method according to claim 12, wherein the distance adjusting step includes the steps of:
detecting current value flowing between the medium and the probe electrode;
logarithmically converting the current value detected to output a first logarithm conversion signal;
logarithmically converting the predetermined current value to output a second logarithm conversion signal;
detecting a difference between the first and second logarithm conversion signals to output a difference signal;
amplifying the difference signal at a predetermined amplification factor; and
changing the distance between the medium and the probe electrode on the basis of the difference signal amplified.

16. A method according to claim 12, wherein the predetermined current value is changed in said current value changing step, taking into consideration a desired distance between the medium and a tip of the probe electrode and the voltage value applied between the medium and the probe electrode.

17. A method according to claim 12, wherein the predetermined current value is changed in said current value changing step in such a manner that a ratio of the voltage applied between the probe electrode and the medium and the predetermined current value becomes always constant.

18. A method according to claim 12, wherein the current flowing between the medium and the probe electrode is a tunnel current.

19. A method according to claim 12, wherein the current flowing to the probe electrode is a field emission current.

* * * * *

UNITED STATES PATENT AND TRADEMARK OFFICE
CERTIFICATE OF CORRECTION

PATENT NO. : 5,289,455
DATED : February 22, 1994
INVENTOR(S) : RYO KURODA, ET AL.

It is certified that error appears in the above-identified patent and that said Letters Patent is hereby corrected as shown below:

ON TITLE PAGE

In [54] Title: "AN/OR" should read --AND/OR--.

COLUMN 1

Line 1, "AN/OR" should read --AND/OR--.

COLUMN 9

Line 19, "signal" should read --signals--.

Signed and Sealed this

Second Day of May, 1995

Attest:

BRUCE LEHMAN

Attesting Officer     Commissioner of Patents and Trademarks